INVENTOR
JOHN J. CROWE

Nov. 3, 1953    J. J. CROWE    2,657,660
APPARATUS FOR OPEN BUTT WELDING METAL WORKPIECES
Filed June 2, 1948    4 Sheets-Sheet 4
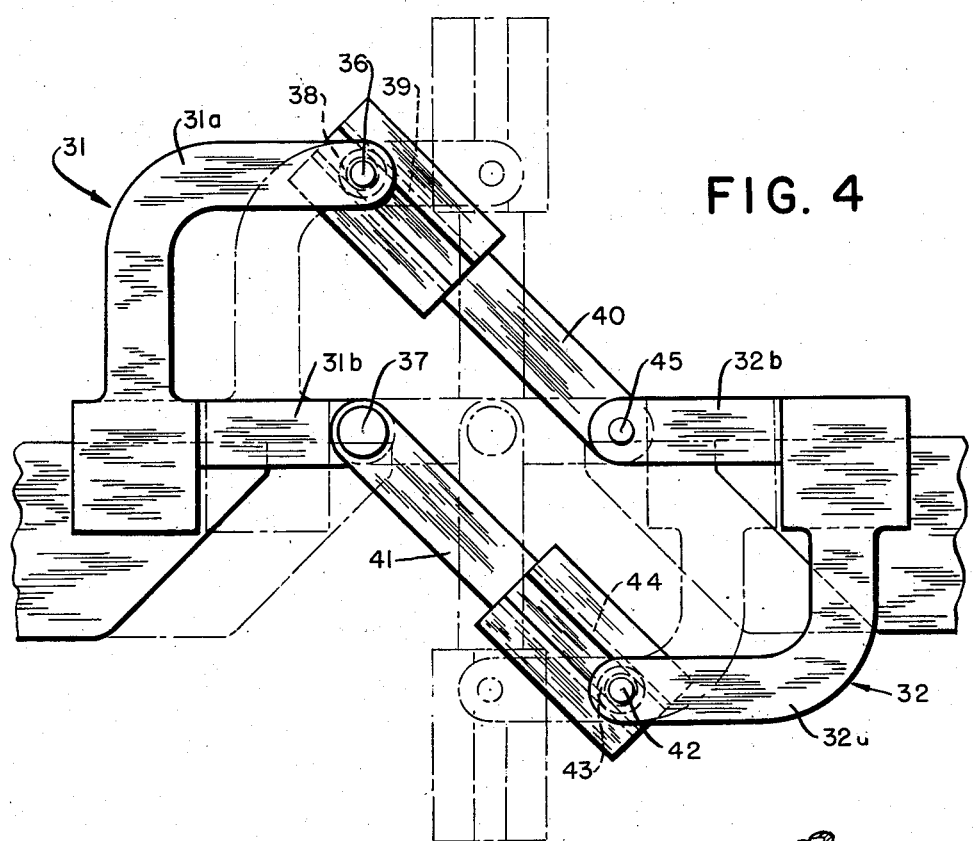
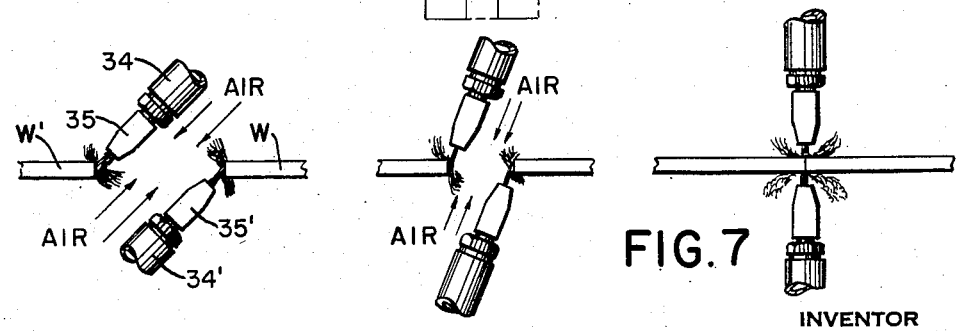
INVENTOR
JOHN J. CROWE
BY
ATTORNEYS

Patented Nov. 3, 1953

2,657,660

UNITED STATES PATENT OFFICE

2,657,660

APPARATUS FOR OPEN BUTT WELDING METAL WORKPIECES

John J. Crowe, Westfield, N. J., assignor to Air Reduction Company, Incorporated, a corporation of New York Application June 2, 1948, Serial No. 30,687

3 Claims. (Cl. 113—59)

This invention relates to open butt welding, i. e., that type of welding in which the work faces to be joined are in open or spaced relation while they are being heated and are then moved together to effect the weld. The metal at the faces may be brought to a molten state by the heating before the faces are brought together, as in fusion welding, in which case the heated faces are moved together with little or no pressure, or the metal at the faces may be heated to less than fusion temperature before they are moved together, as in solid-phase pressure welding, and in this case the heated faces are pressed together under a greater amount of pressure to effect the weld. The heating of the metal at the faces is usually done by flames, such as oxyacetylene flames, and the invention deals with an open butt welding method in which this type of heating is employed, but it is immaterial under the invention whether the welding is fusion welding or solid-phase pressure welding.

Heretofore when practicing open butt welding with flame heating it has not been possible to keep the heating flames directed against the faces to be joined during the entire time they are being moved together with the result that unless the heated faces are moved together very rapidly they are likely to cool off too much before they reach contacting relation and are also likely to become oxidized because of the access which the atmospheric air has to them when they are no longer being protected by impingement of the flames on them.

The principal object of this invention is to provide an improved method of open butt welding with flame heating in which the flames continue to be directed against the faces to be joined during their entire movement to contacting relation thereby making it impossible for the faces to cool too much before they abut and lessening the danger of oxidation by the atmosphere no matter how slowly the faces are moved together.

Another object of the invention is to provide improved welding apparatus by which the method can be carried out.

The improved method, and one form of apparatus suitable for carrying it out, are illustrated in the accompanying drawings, in which:

Fig. 4 is an enlarged side elevation of the torch supporting portion of the apparatus; and Figs. 5, 6 and 7 are explanatory views showing the relative positions of the torches and the work as the welding operation progresses.

Figure 1:
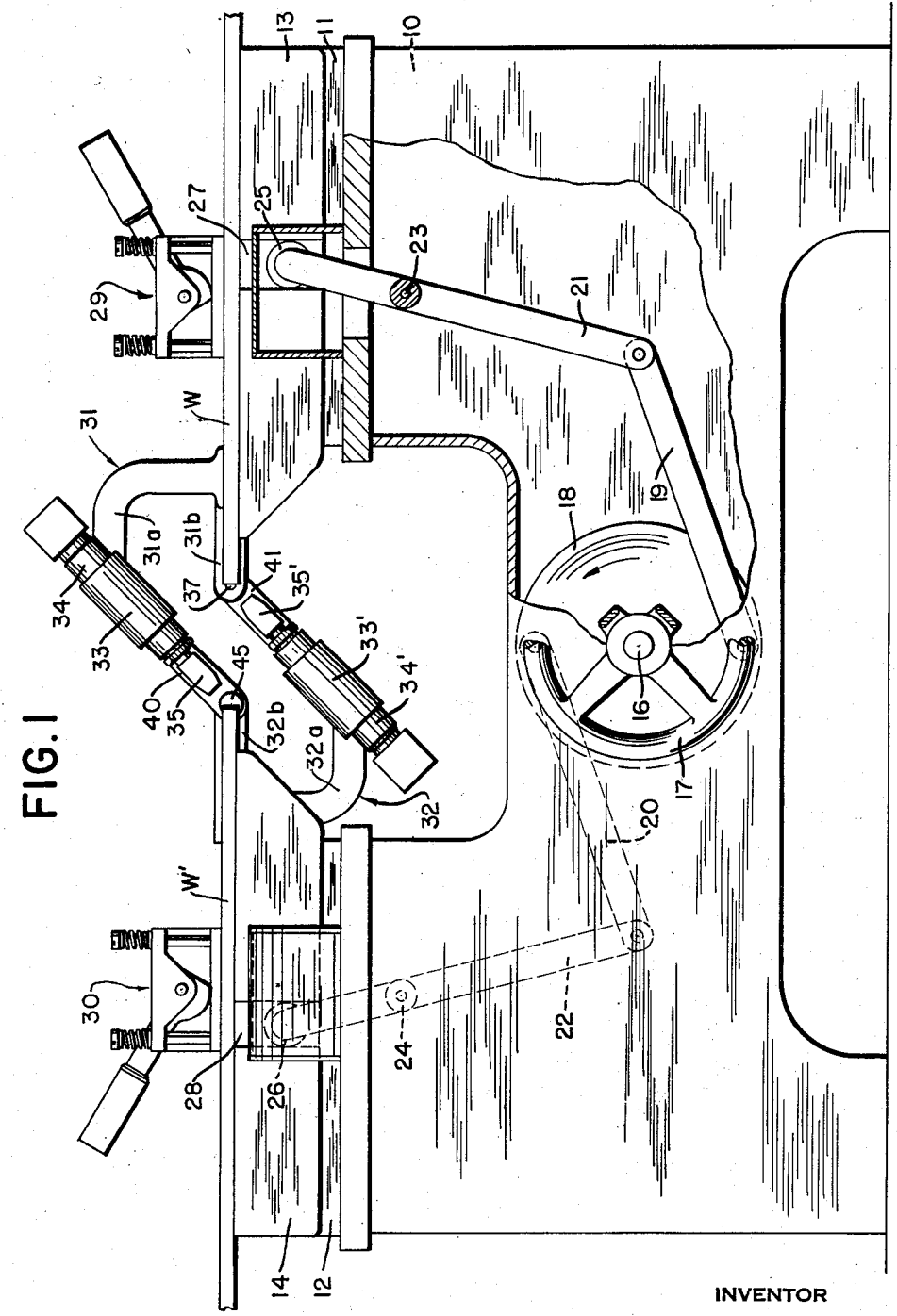
Figure 1 is a side elevation of the apparatus showing the parts in starting position with the faces to be welded in spaced relation.
Figure 2:
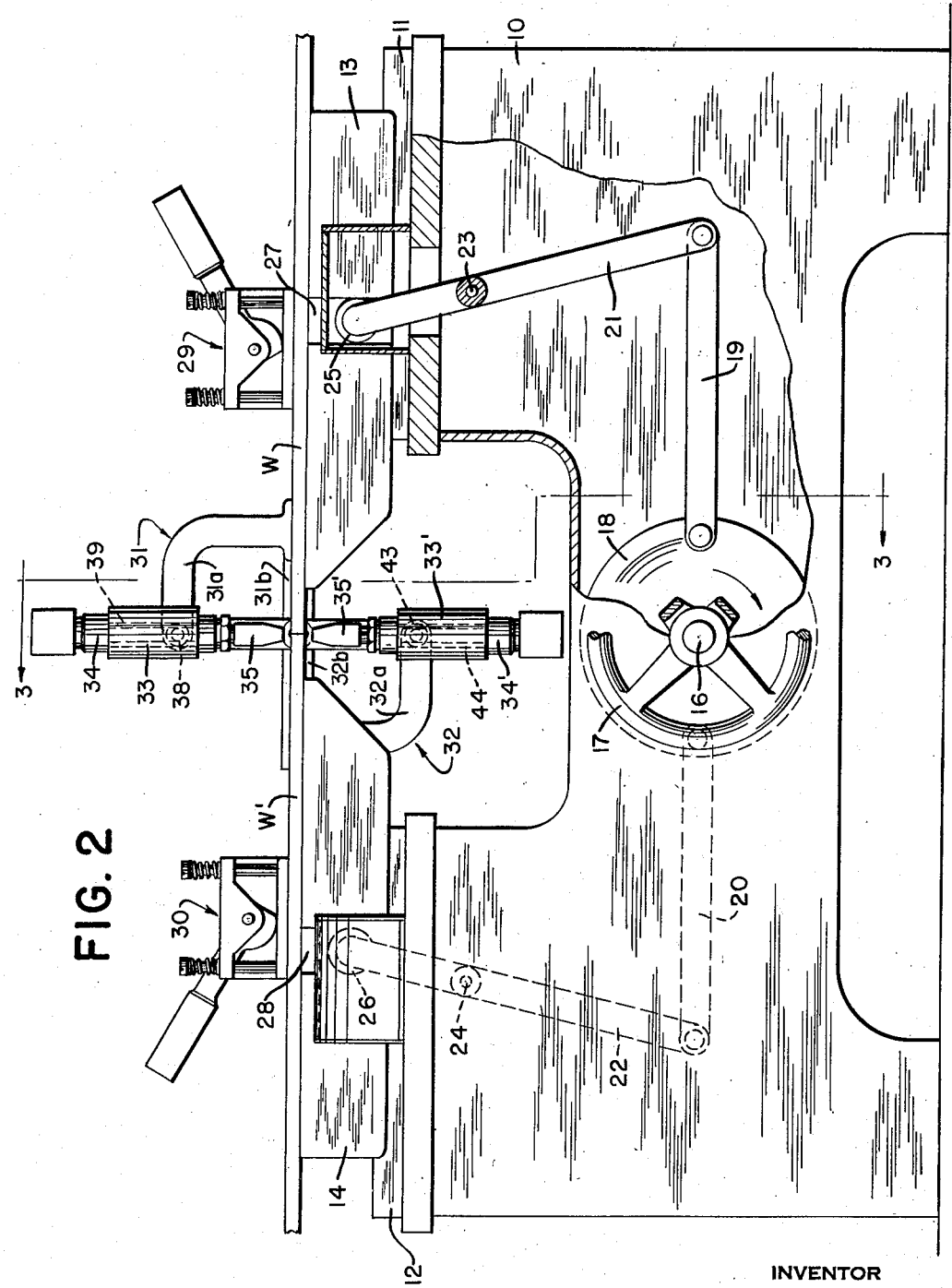
Fig. 2 is a view similar to Fig. 1 showing the position of the parts after the faces to be welded have been brought together.

Essentially the machine comprises a main frame weldment 10 (Figs. 1 and 3) on one end of which are mounted rails or guides 11 and on the other end of which are mounted similar guides 12. A pair of movable table tops or work supports 13 and 14 are mounted to slide or roll along the guides 11 and 12 respectively. Mechanism is provided for moving the table tops toward or away from each other and consists of a shaft 16 rotatably mounted in the main frame 10, a hand wheel 17 on the end of shaft 16, and a disc or wheel 18 fixed to the shaft which serves as a crank. Links 19 and 20 pivotally attached to diametrically opposed points on the crank wheel 18 connect the crank wheel to levers 21 and 22 respectively. These levers are pivoted at fixed points 23 and 24 on the main frame. Rolls 25 and 26 mounted on the ends of levers 21 and 22 work in vertical slots 27 and 28 of table tops 13 and 14 respectively. It is evident from this construction that rotation of the hand wheel 17 causes rotation of the crank wheel 18 which causes rotation of levers 21 and 22 about their respective pivot points, causing the table tops 13 and 14 to move horizontally along the guides 11 and 12. The table tops move simultaneously the same distance toward or away from each other. By rotating the crank wheel 18 a quarter of a revolution counterclockwise from the position shown in Fig. 1, the table tops are moved to the position shown in Fig. 2 in which they are their minimum distance apart. Clamps 29 and 30, mounted on table tops 13 and 14, are provided for holding the work-pieces W and W' with their edge faces to be welded in confronting spaced relation when the parts of the apparatus are in the position shown in Fig. 1.

A bracket 31 extending upwardly from the table top 13, and a bracket 32 extending downwardly from the table top 14 pivotally support torch holders 33 and 33' respectively in the manner hereinafter more fully described, and gas torches 34 and 34' are mounted in these holders. The torches may be conventional oxyacetylene heating torches of suitable design to properly heat the particular work-pieces being welded. Preferably the torches are equipped with conventional block type tips 35 and 35' adapted to project rows of heating flames against the confronting edge faces of the work-pieces.

Since the method of the invention contemplates directing the heating flames continually against the faces to be welded while they are being moved together, means are provided for correlating the motion of the work-pieces and the torches to bring this about. The torch-work relationship throughout the welding operation is illustrated in Figs. 5, 6 and 7 from which it will be seen that at the beginning of the operation when the edge faces of the work-pieces are spaced their maximum distance apart the upper torch is inclined at an obtuse angle to the plane of the work-piece W' so that the tip of the torch will direct heating flames diagonally downward against the edge face of this work-piece, and the lower torch is similarly inclined at an obtuse angle to the plane of the work-piece W so that its tip will direct heating flames diagonally upward against the edge face of this work-piece. As the work-pieces are moved toward each other to bring the edge faces together the torches are automatically and gradually shifted in position to change the angularity of each of them with respect to the corresponding work-piece, the movement of the torches being such that the torch tips continue to direct heating flames against the work edge faces until they come in contact, at which time the two torches will be in vertical alignment with each other and with the welded seam as shown in Fig. 7. Of course, the flames may be continued as long as desired after the edge faces are in abutting relation and after the torches reach the position shown in Fig. 7 to further heat the joint. In the particular apparatus shown in the drawings this is accomplished as follows:

The bracket 31 that supports the upper torch on table top 13 has two arms, an upper arm 31a above the level of the work and a lower arm 31b in the same plane as the axes of the work-pieces. A pivot pin is fitted into a hole near the end of each arm, the spacing being such that the pins are in vertical alignment with the work interface when the table tops are their minimum distance apart and the edge faces of the work-pieces are abutting. The pivot pin in arm 31a is designated 36 and the pivot pin in arm 31b is designated 37. A roller 38 on the end of pin 36 rolls in a slot 39 formed in a part projecting rearwardly from the upper end of a torch holder bracket 40 for the upper torch. Pivot pin 37 is pivotally attached to the upper end of a second torch holder bracket 41 for the lower torch.

The bracket 32 that supports the lower torch from table top 14 also has two arms, a lower arm 32a below the level of the work and an upper arm 32b which is in the same plane as the axes of the work-pieces and hence in the same plane as the lower arm 31b of the torch-supporting bracket 31 for the upper torch. Thus the two arms of the bracket 32 that supports the lower torch corresponding to the two arms of the bracket 31 that supports the upper torch except that they are reversed in position. A pivot pin 42 and a roller 43 are mounted on arm 32a of the lower bracket 32, and the roller rolls in a slot 44 formed in a part projecting rearwardly from the lower end of the torch-supporting bracket 41 for the lower torch. A pivot pin 45 pivotally connects the lower end of the torch holder bracket 40 for the upper torch to the end of the upper arm 32b of the lower bracket 32. Thus it will be seen that the lower end of torch holder bracket 40 for the upper torch has pivotal connection with the bracket 32 fixed to the table top 14 and its upper end has pivotal and sliding connection (by means of the roller 38 and slot 39) with the bracket 31 fixed to the table top 13. Similarly, the upper end of the torch holder bracket 41 for the lower torch has pivotal connection with the bracket 31 fixed to the table top 13, and its lower end has pivotal and sliding connection (by means of the roller 43 and slot 44) with the lower bracket 32 fixed to the table top 14. Fig. 4 clearly shows in full lines the positions of the two torch holder brackets 40 and 41 when the table tops 13 and 14 are their maximum distance apart and clearly shows in broken lines their positions when the table tops are their minimum distance apart and the edge faces of the work-pieces are abutting.

Figure 3:
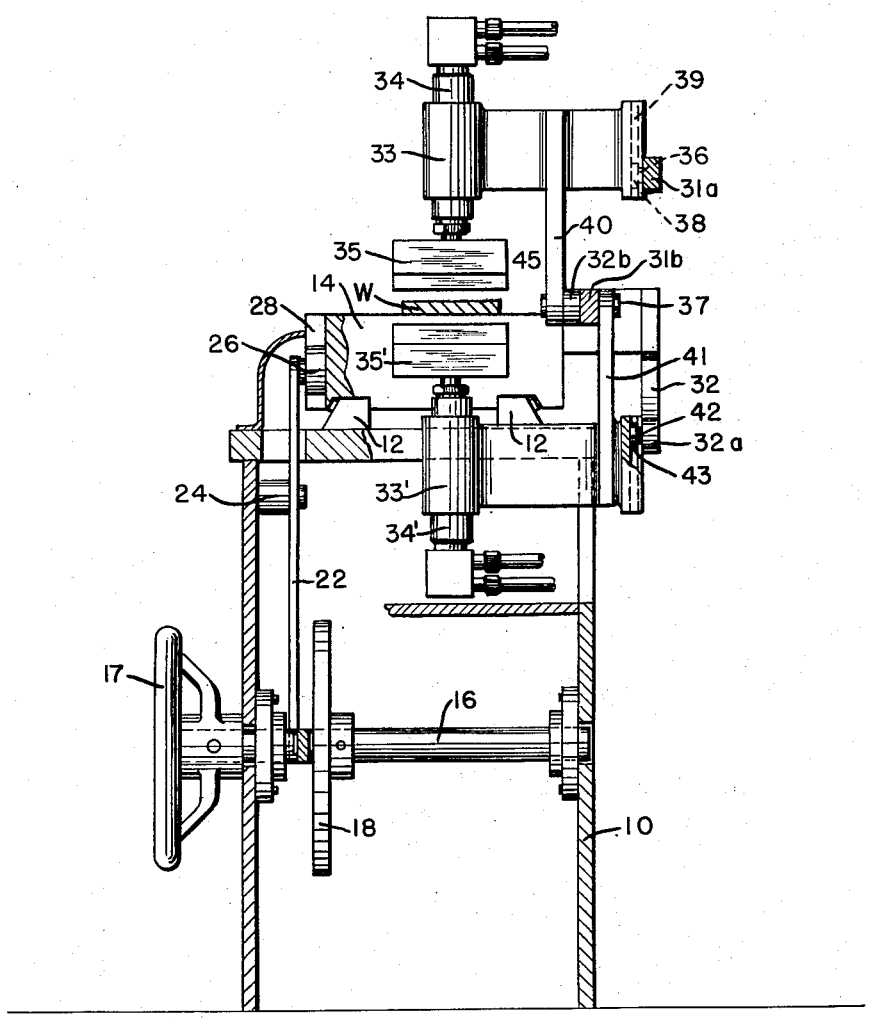
Fig. 3 is a vertical transverse section of the apparatus taken on the line 3—3 of Fig. 2.

The above-described torch holder 33 for the upper torch (Fig. 1) is supported at the front side of the torch holder bracket 40, and similarly the torch holder 33' for the lower torch is supported at the front side of the torch holder bracket 41, as best shown in Fig. 3. Each torch holder supports its torch with the torch axis in parallel relation to the corresponding torch holder bracket. Hence, as the torch holder brackets 40 and 41 change their positions during movement of the work-pieces toward each other as above described, the two torches will change their positions accordingly, each torch always remaining parallel to the axis through the pivot points at opposite ends of the corresponding torch holder bracket. Since pivot points 37 and 45 always remain directly in line with the work edge faces to be welded it is evident that the heating flames of the two torches will necessarily be directed at the edge faces of the two work-pieces during the entire movement of the edge faces toward each other, the pivotal movement of the torches causing the flames to be directed more and more parallel to the work faces as the work faces move toward each other, as depicted in Figs. 5, 6 and 7, so that even when the work faces closely approach each other, each set of flames can heat the corresponding work face over its whole width instead of being blocked by the corner of the other work-piece as they would be if the original angularity of the flames were retained throughout the movement of the work-pieces into contacting relation. This, of course, is of particular advantage when welding relatively thick work-pieces having wide faces to be heated.

No matter how slowly the heated work faces may be moved into contact to effect the weld, the continual direction of the flames against the faces during their entire movement to contacting relation eliminates any possibility of their cooling off too much before they come in contact and also prevents their oxidation by the atmosphere. Moreover, the torch arrangement allows better circulation of air to the flames as indicated by the arrows in Figs. 5 and 6 and this increases the efficiency of the welding operation. In the particular apparatus shown in the drawings the torch tips remain a constant distance from the work faces to be welded at all times. This is a desirable feature but not always essential. Also, in the particular apparatus illustrated both table tops or work supports are movable toward and away from each other but one of them could, of course, be stationary.

The flames may heat the work faces either to fusion temperature or to a temperature at which the metal at the faces is in a plastic condition, as in solid-phase pressure welding. In the latter case air or hydraulic cylinders should be substituted for the hand wheel and lever mechanism shown in the drawings for moving the work-pieces together in order that the faces to be welded can be brought together with sufficient pressure.

The apparatus above described may be used not only for performing an open butt welding method of the fusion or solid-phase type, but it is also well adapted for use in performing the kind of welding method disclosed in the copending application of Donald L. Smith, Serial No. 749,657, filed May 22, 1947, and assigned to the assignee of the present application. In that method the work faces to be joined are flame heated to less than fusion temperature while they are in open or spaced relation; then the faces are brought together and while they are in abutting relation the flame heating is continued until the metal at the abutting faces fuses sufficiently to effect a fusion weld.

I claim:

1. Apparatus for butt welding metal workpieces comprising a pair of work supports mounted for relative movement toward and away from each other and adapted to hold the work-pieces with their longitudinal axes in substantially the same plane and with their faces to be welded in confronting spaced relation, means for moving said work supports toward each other to bring said work faces into abutting relation, a pair of gas heating torches each having a torch tip, means for supporting one of the torches above the work and the other torch below the work with the tips of the torches pointed toward the work, said means including a torch holder for each torch, each torch holder being pivotally and slidably supported on a different one of the work supports at regions spaced from the plane of the axes of the workpieces and each torch holder being pivotally connected to the work support to which it is not otherwise connected at a region closer to said plane so that when said work faces are in spaced relation the tip of one torch directs its heating flames diagonally downward against one of said work faces and the tip of the other torch directs its heating flames diagonally upward against the other of said work faces and so that movement of the work supports toward each other swings the torch holders about their pivots and maintains them in position to cause the torch tips to continually direct the heating flames diagonally against said work faces until the work faces are in abutting relation.

2. Apparatus for butt welding metal workpieces comprising a pair of work supports mounted for relative movement toward and away from each other and adapted to hold the work-pieces with their longitudinal axes in substantially the same plane and with their faces to be welded in confronting spaced relation, means for moving said work supports toward each other to bring said work faces into abutting relation, a pair of members each carrying a torch holder, one of said members being supported by one of said work supports and being located above the work and the other member being supported by the other of said work supports and being located below the work, a gas heating torch in each holder, each torch having a torch tip, each of said members being pivotally and slidably supported on one of the work supports at a region spaced from the plane of the axes of the work-pieces and pivotally connected to the other work support at a region closer to said plane so that when said work faces are in spaced relation the tip of one torch directs its heating flames diagonally downward against one of said work faces and the tip of the other torch directs its heating flames diagonally upward against the other of said work faces and so that movement of the work supports toward each other swings said members about their pivots and maintains the torches in position to cause the torch tips to continually direct the heating flames diagonally against said work faces until the work faces are in abutting relation.

3. Apparatus for butt welding metal workpieces comprising a pair of work supports mounted for relative movement toward and away from each other and adapted to hold the work-pieces with their longitudinal axes in substantially the same plane and with their faces to be welded in confronting spaced relation, means for moving said work supports toward each other to bring said work faces into abutting relation, a pair of members each carrying a torch holder, one of said members being supported by one of said work supports and being located above the work and the other member being supported by the other of said work supports and being located below the work, a gas heating torch in each holder, each torch having a torch tip, each of said members being pivotally connected to one of the work supports substantially in the plane of the axes of the work-pieces and being pivotally and slidably supported on the other work support at a region more remote from said plane so that when said work faces are in spaced relation the tip of one torch directs its heating flames diagonally downward against one of said work faces and the top of the other torch directs its heating flames diagonally upward against the other of said work faces and so that movement of the work supports toward each other swings said members about their pivots and maintains the torches in position to cause the torch tips to continually direct the heating flames diagonally against said work faces until the work faces are in abutting relation.

JOHN J. CROWE.

References Cited in the file of this patent
UNITED STATES PATENTS

| Number | Name | Date |
|---|---|---|
| 427,971 | Coffin | May 13, 1890 |
| 637,009 | Muehleisen | Nov. 14, 1899 |
| 1,091,479 | Bucknam | Mar. 31, 1914 |
| 1,880,076 | Deming | Sept. 27, 1932 |
| 1,915,913 | Anderson | June 27, 1933 |
| 1,930,847 | Anderson | Oct. 17, 1933 |
| 2,040,240 | Coberly | May 12, 1936 |
| 2,047,306 | Brookins | July 14, 1936 |
| 2,053,216 | Deming | Sept. 1, 1936 |
| 2,176,664 | Burke | Oct. 17, 1939 |
| 2,285,518 | Jones | June 9, 1942 |
| 2,434,321 | Kleiner | Jan. 13, 1948 |